US010074029B2

(12) United States Patent
Tojo

(10) Patent No.: US 10,074,029 B2
(45) Date of Patent: Sep. 11, 2018

(54) IMAGE PROCESSING SYSTEM, IMAGE PROCESSING METHOD, AND STORAGE MEDIUM FOR CORRECTING COLOR

(71) Applicant: CANON KABUSHIKI KAISHA, Tokyo (JP)

(72) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 14/994,271

(22) Filed: Jan. 13, 2016

(65) Prior Publication Data
US 2016/0210728 A1    Jul. 21, 2016

(30) Foreign Application Priority Data

Jan. 20, 2015  (JP) ................. 2015-008923

(51) Int. Cl.
*G06K 9/00*    (2006.01)
*G06K 9/46*    (2006.01)
*H04N 1/60*    (2006.01)

(52) U.S. Cl.
CPC ....... *G06K 9/4661* (2013.01); *G06K 9/00295* (2013.01); *G06K 9/4652* (2013.01); *H04N 1/6052* (2013.01)

(58) Field of Classification Search
USPC ............ 348/143, 239, 701, 208.99; 382/103, 382/154, 162, 167, 233
See application file for complete search history.

(56) References Cited

U.S. PATENT DOCUMENTS

| 7,110,597 B2 * | 9/2006 | Goldsmith | .......... H04N 1/6027 348/E9.04 |
| 7,450,735 B1 * | 11/2008 | Shah | ................. G06T 7/292 348/143 |
| 7,474,339 B2 * | 1/2009 | Hoshuyama | .......... H04N 9/045 348/223.1 |
| 7,519,197 B2 * | 4/2009 | Shan | ................. G06K 9/00791 382/103 |
| 7,986,833 B2 * | 7/2011 | Shen | .................. H04N 1/6058 382/162 |

(Continued)

FOREIGN PATENT DOCUMENTS

| JP | 2007-329555 A | 12/2007 |
| JP | 2013-210844 A | 10/2013 |

OTHER PUBLICATIONS

U.S. Appl. No. 15/057,408, filed Mar. 1, 2016, inventor Hiroshi Tojo.

*Primary Examiner* — Xuemei Chen
(74) *Attorney, Agent, or Firm* — Carter, DeLuca, Farrell & Schmidt LLP

(57) ABSTRACT

A detecting unit detects subjects from an image photographed by a first camera and an image photographed by a second camera different from the first camera, a deciding unit decides whether a first subject photographed by the first camera and a second subject photographed by the second camera are a same subject, and a generating unit generates color correction information based on information indicating color of plural sets of the subjects decided as the same subject by the deciding unit. Thus, it is possible to reduce a difference of color between plural cameras even in the case where the photographing ranges of the plural cameras do not overlap.

14 Claims, 7 Drawing Sheets

(56) References Cited

U.S. PATENT DOCUMENTS

| | | | |
|---|---|---|---|
| 8,428,350 B2* | 4/2013 | Panahpour Tehrani | H04N 5/247 348/239 |
| 8,532,411 B2* | 9/2013 | Shimizu | H04N 19/80 382/233 |
| 8,548,228 B2* | 10/2013 | Shimizu | H04N 19/597 382/154 |
| 8,553,983 B2* | 10/2013 | Imaoka | G06F 21/32 382/118 |
| 8,675,091 B2* | 3/2014 | Silverstein | H04N 5/2258 348/208.99 |
| 9,092,868 B2* | 7/2015 | Tojo | G06T 7/0081 |
| 9,158,964 B2* | 10/2015 | Li | G06K 9/00295 |
| 9,237,266 B2* | 1/2016 | Tojo | G06K 9/00771 |
| 9,462,160 B2* | 10/2016 | Hirakawa | H04N 1/6086 |
| 9,609,233 B2* | 3/2017 | Gupta | G06T 5/009 |
| 9,615,064 B2* | 4/2017 | Millar | H04N 7/181 |
| 9,690,978 B2* | 6/2017 | Yamada | G06K 9/00234 |
| 2007/0237387 A1 | 10/2007 | Avidan et al. | |
| 2011/0075924 A1* | 3/2011 | Shrestha | H04N 1/6011 382/167 |
| 2013/0271667 A1* | 10/2013 | Tojo | H04N 5/147 348/701 |
| 2015/0279049 A1 | 10/2015 | Tojo et al. | |

\* cited by examiner

IMAGE PROCESSING SYSTEM, IMAGE PROCESSING METHOD, AND STORAGE MEDIUM FOR CORRECTING COLOR

BACKGROUND OF THE INVENTION

Field of the Invention

The present invention particularly relates to an image processing system to be suitably used to reduce a difference of color of same subjects in images, an image processing method for the image processing system, a program for performing the image processing method, and a recording medium for storing the program.

Description of the Related Art

Conventionally, there has been a system in which plural cameras are installed in a convenience store, a shopping mall, an airport or the like, and the installed cameras are connected to a PC (personal computer) or the like via a network to be able to watch or monitor plural points. For example, the system concerned is used to search for, from among plural video images photographed or shot by currently used cameras, a specific person such as a shoplifter or the like included in a recorded video image past photographed or shot by a certain camera. At this time, it is possible, by arranging and displaying both the recorded video images and the video images of the plural cameras currently used and then visually confirming these images, to know or grasp which photographing range of the camera/cameras the specific person is currently in.

In case of visually identifying the specific person from among the video images of the plural cameras, it is difficult to correctly identify the specific person if the color of the specific person has been shifted or deviated. Here, it has been known that the color reproduced on the camera is influenced according to the color temperatures of environmental light at the place where the relevant camera has been installed. For example, when an object illuminated by a fluorescent lamp and an object illuminated by an incandescent lamp are compared with each other, the blue portion of the object is strongly reproduced under the fluorescent lamp, whereas the red portion thereof is strongly reproduced under the incandescent lamp. At the outdoors in fine weather, the color temperature at a sunny place is different from that at a shaded place. Since the cameras are installed under various illumination conditions, the installed camera is greatly influenced by the above difference of the color temperature of the environmental light. Besides, the color reproduction characteristic of the camera differs if an optical system such as a lens, an image pickup element, or the like differs. Thus, when the plural cameras are installed, it is difficult to prepare and provide all the cameras having the same color reproduction characteristic. As a result, the color reproduction characteristic is different for each camera.

As just described, such a watch camera (security camera) network has an inevitable problem that a difference of color occurs between the cameras. For this reason, the technique of correcting this difference of color between the cameras has been proposed.

Japanese Patent Application Laid-Open No. 2007-329555 discloses the method of correcting the colors between the plural cameras arranged such that the parts of the adjacent photographing areas overlap each other. In this method, the color histogram (i.e., the integrated value of RGB signals) is calculated for each color by using the overlapped photographing areas, and adjusted to reduce the difference between the calculated integrated values of the camera images for each color.

However, in the above related art, a problem occurs when it intends to watch the wider area. Namely, it typically becomes difficult to arrange the cameras such that their photographing areas always overlap each other, in proportion as the place to be watched becomes wider. Therefore, the photographing areas of the plural cameras do not often overlap each other, and it is impossible in such a case to reduce the difference of color. Thus, it is impossible by the method disclosed in Japanese Patent Application Laid-Open No. 2007-329555 to correct the difference of color.

Therefore, in the above related art, when the photographing areas of the cameras do not overlap each other, it is necessary for a user to instruct the camera, for which the color correction is performed, to photograph a reference chart and/or to designate the target person images as the same person image. Consequently, a heavy load is applied to the user.

Accordingly, the present invention aims to provide the technique capable of reducing the difference of color between the plural cameras even in the case where the photographing ranges of the plural cameras do not overlap.

SUMMARY OF THE INVENTION

In order to solve the above problem, an image processing system according to the present invention comprises: a detecting unit configured to detect subjects from an image photographed by a first camera and an image photographed by a second camera different from the first camera; a deciding unit configured to decide whether or not a first subject photographed by the first camera and a second subject photographed by the second camera are a same subject; and a generating unit configured to generate color correction information based on information indicating color of plural sets of the subjects decided as the same subject by the deciding unit.

Further features of the present invention will become apparent from the following description of exemplary embodiments with reference to the attached drawings.

DESCRIPTION OF THE EMBODIMENTS

Hereinafter, preferred embodiments of the present invention will be described in detail in accordance with the accompanying drawings.

Embodiment

Figure 1:
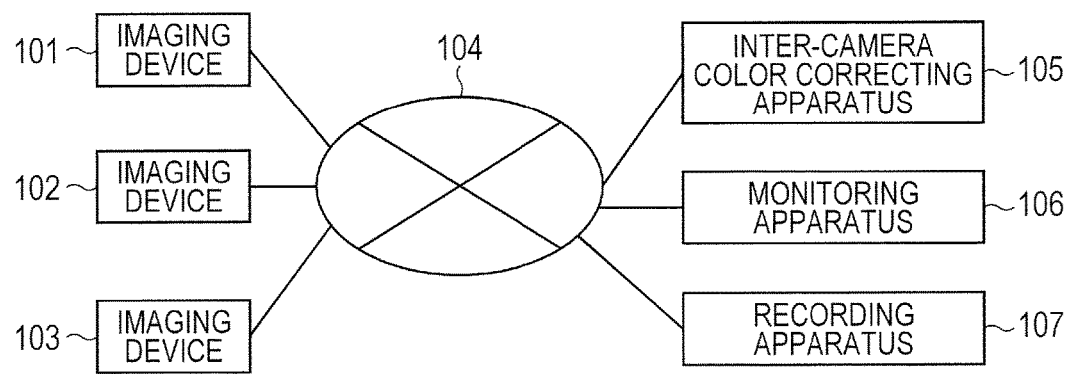
FIG. 1 is a block diagram illustrating an example of the configuration of a camera network system.

FIG. 1 is a block diagram illustrating an example of the configuration of a camera network system.

In the system, each of imaging devices 101 to 103 transmits a photographed (or taken) video image to an inter-camera color correcting apparatus 105 or the like via a network 104. In the present embodiment, it is assumed that each of the imaging devices 101 to 103 is a camera and the photographing ranges of the respective imaging devices 101 to 103 on the network do not overlap mutually.

The inter-camera color correcting apparatus 105 is the device which generates a parameter for correcting a difference of color between the images photographed by the imaging devices, based on the video image of each imaging device received via the network. A monitoring apparatus 106 is the device which displays the video image of each imaging device received via the network to enable a user to monitor the displayed video image. A recording apparatus 107 is the device which records the video image of each imaging device received via the network.

Figure 2:
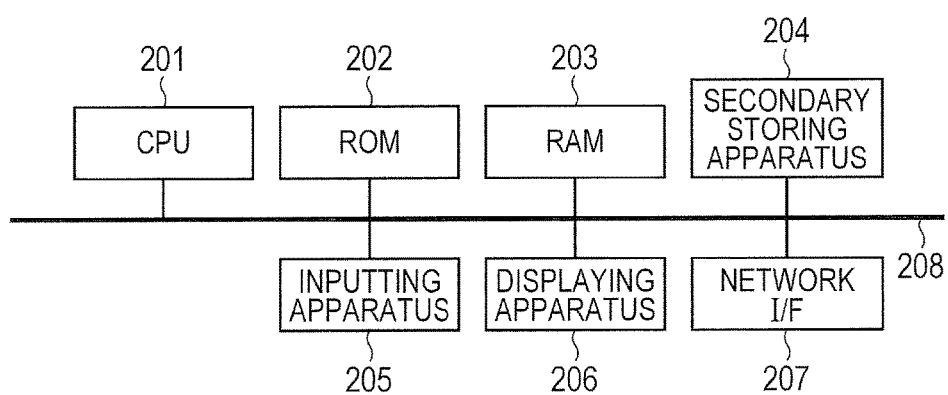
FIG. 2 is a block diagram illustrating an example of the hardware constitution of an inter-camera color correcting apparatus, a monitoring apparatus and a recording apparatus.

FIG. 2 is a block diagram illustrating an example of the hardware constitution of each of the inter-camera color correcting apparatus 105, the monitoring apparatus 106 and the recording apparatus 107.

A CPU (central processing unit) 201 executes the programs stored in a ROM (read only memory) 202 and/or a RAM (random access memory) 203. Here, the ROM 202 is the non-volatile memory in which the programs for the processes in the present embodiment, the programs necessary for other controlling, and various data have been stored. The RAM 203 is the volatile memory in which temporary data such as frame image data, pattern discrimination result data, and the like are stored.

A secondary storing apparatus 204 is the rewritable secondary memory such as a hard disk drive, a flash memory or the like in which image information, the image processing programs, various setting contents and the like are stored. The stored information is transferred to the RAM 203, and then the CPU 201 executes the programs and uses the data with use of the transferred information. The secondary storing apparatus 204 is an example of a non-transitory computer-readable recording medium.

An inputting apparatus 205 is the device such as a keyboard, a mouse and the like by which various data can be input from the user. A displaying apparatus 206 is the device such as a CRT (cathode-ray tube), an LCD (liquid crystal display) or the like which displays the process result and the like to the user. A network I/F (interface) 207 is the device such as a modem, a LAN (local area network) or the like which performs connection with a network such as the Internet, an intranet and/or the like. The above hardware constituent elements 201 to 207 are mutually connected via a bus 208 to exchange various data.

The functions of the inter-camera color correcting apparatus 105, the monitoring apparatus 106 and the recording apparatus 107, which are respectively described later with reference to FIGS. 3 to 5, have been installed as the software programs running on the operating system.

Figure 6:
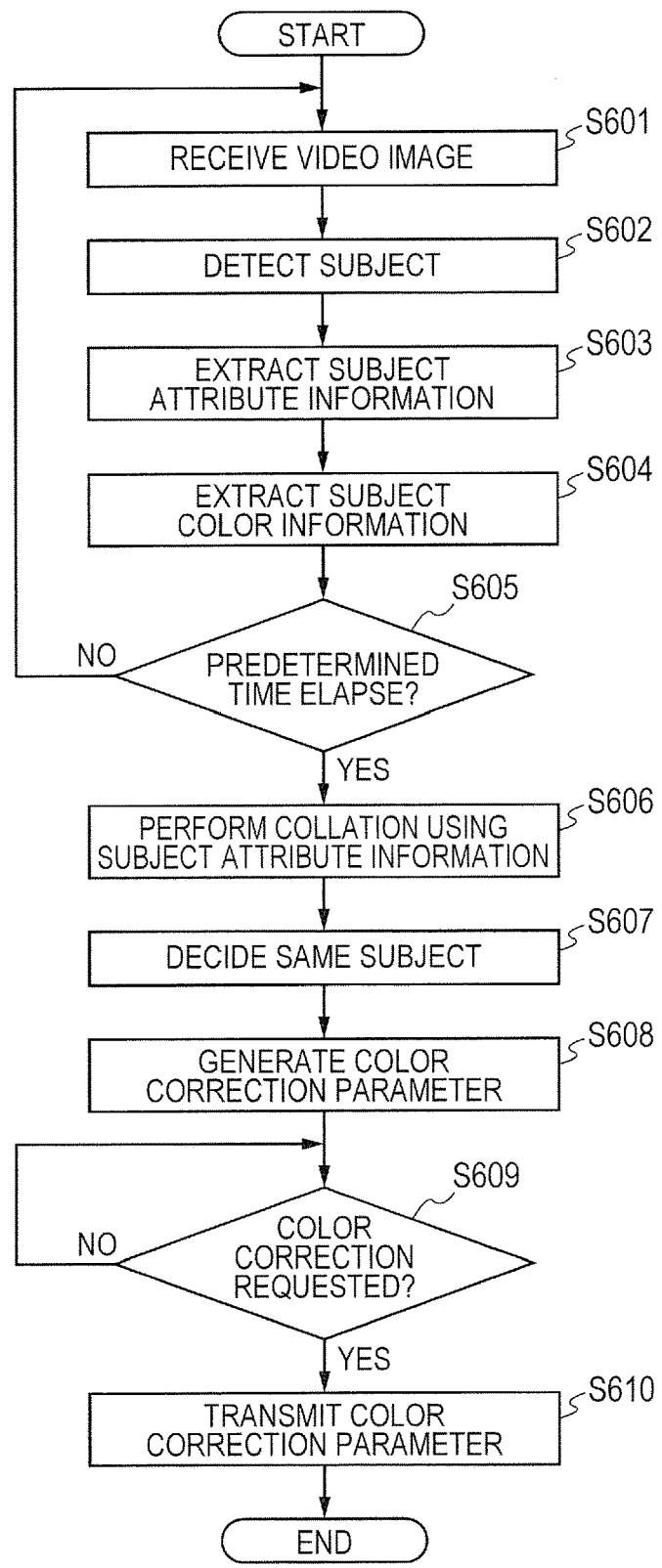
FIG. 6 is a flow chart for describing an example of the process to be performed by the inter-camera color correcting apparatus.

That is, on the premise that the CPU 201 of the inter-camera color correcting apparatus 105 executes the program stored in the ROM 202 or the secondary storing apparatus 204 of the inter-camera color correcting apparatus 105, the later-described functions illustrated in FIG. 3 and processes indicated by a flow chart illustrated in FIG. 6 are achieved.

Figure 9:
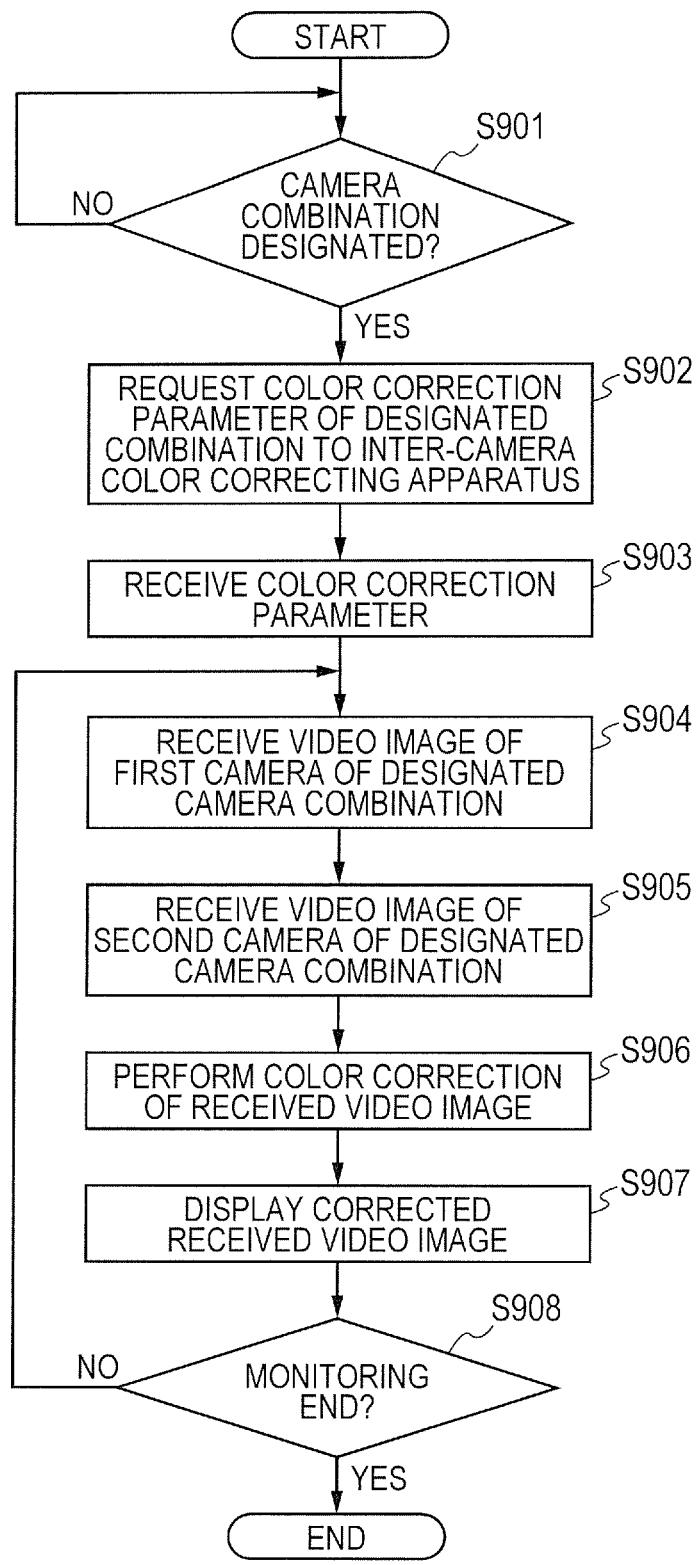
FIG. 9 is a flow chart for describing an example of the process to be performed by the monitoring apparatus.

Further, on the premise that the CPU 201 of the monitoring apparatus 106 executes the program stored in the ROM 202 or the secondary storing apparatus 204 of the monitoring apparatus 106, the later-described functions illustrated in FIG. 5 and processes indicated by a flow chart illustrated in FIG. 9 are achieved.

Figure 8:
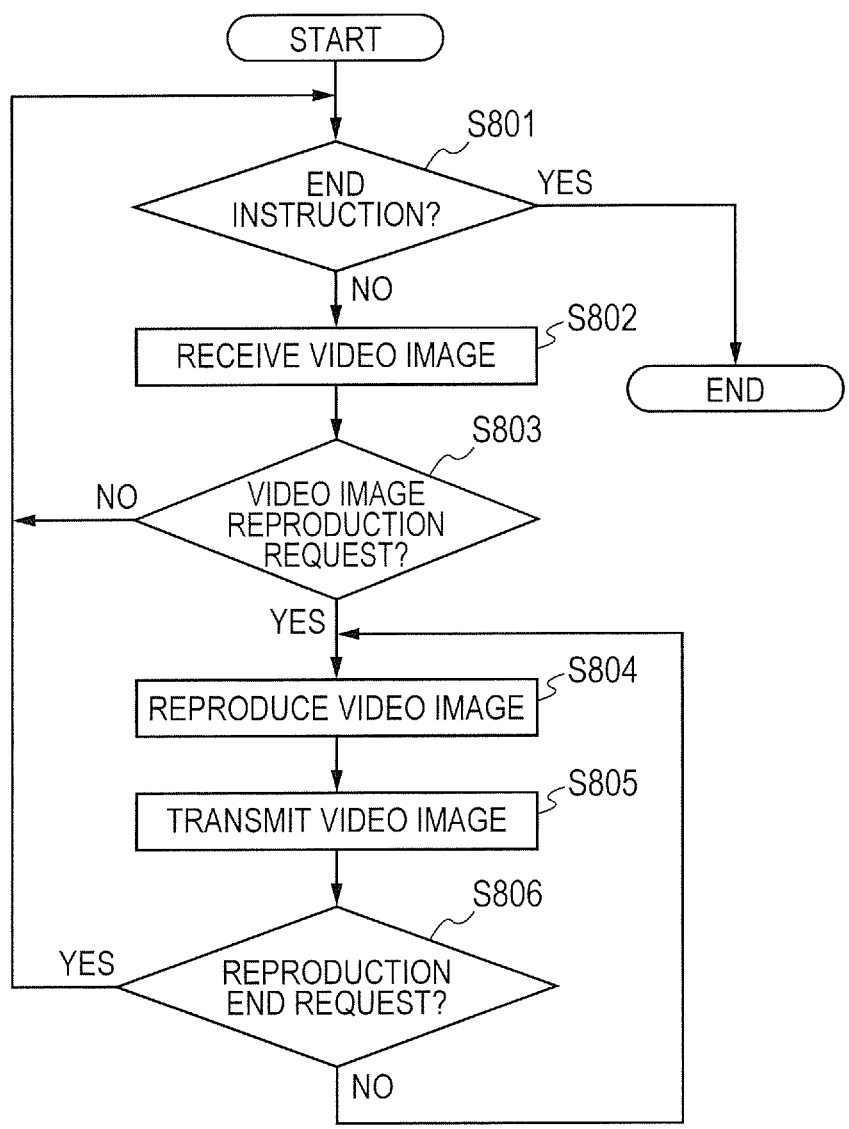
FIG. 8 is a flow chart for describing an example of the process to be performed by the recording apparatus.

Furthermore, on the premise that the CPU 201 of the recording apparatus 107 executes the program stored in the ROM 202 or the secondary storing apparatus 204 of the recording apparatus 107, the later-described functions illustrated in FIG. 4 and processes indicated by a flow chart illustrated in FIG. 8 are achieved.

Figure 3:
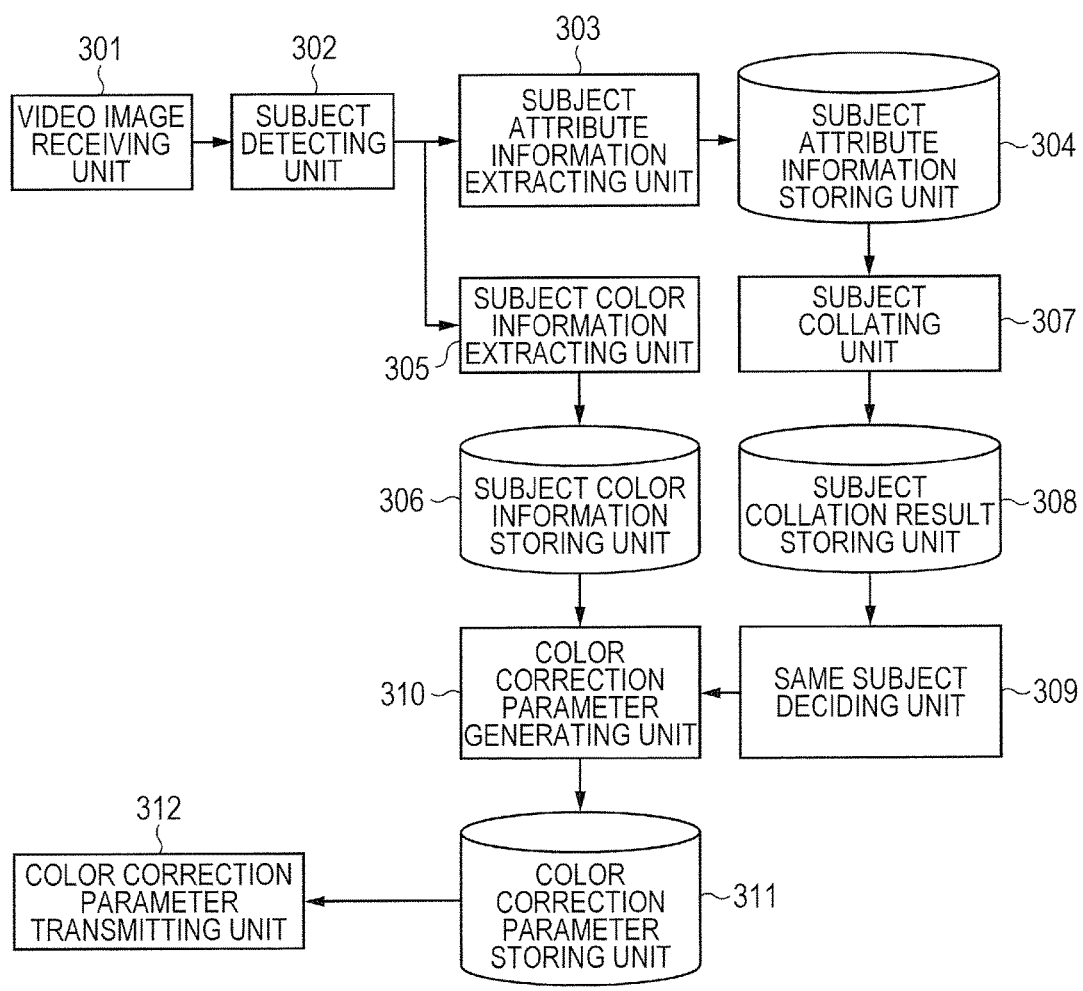
FIG. 3 is a block diagram illustrating an example of the function constitution of the inter-camera color correcting apparatus.

FIG. 3 is the block diagram illustrating an example of the function constitution of the inter-camera color correcting apparatus 105 which is an example of an image processing apparatus according to the present embodiment.

A video image receiving unit 301 receives, via the network I/F 207, the video images photographed and transmitted by the imaging devices 101 to 103 via the network 104. A subject detecting unit 302 detects the area of a subject (i.e., a person in the present embodiment) from the video image received by the video image receiving unit 301.

A subject attribute information extracting unit 303 extracts subject attribute information from the area of the subject detected by the subject detecting unit 302. Here, it should be noted that the subject attribute information includes information related to color and information not related to color. For example, the information related to color is information concerning a clothing color, a hair color or the like, and the information not related to color is information concerning a face, a height, whether or not the subject (person) wears sunglasses, whether or not the subject (person) has a beard, whether or not the subject (person) carries a bag, or the like. Since the subject attribute information extracting unit 303 in the present embodiment aims to correct color, the information not related to color is extracted. A subject attribute information storing unit 304, which is constituted by the RAM 203 and/or the secondary storing apparatus 204, stores therein the subject attribute information extracted by the subject attribute information extracting unit 303.

A subject color information extracting unit 305 extracts color information from the area of the subject detected by the subject detecting unit 302. A subject color information storing unit 306, which is constituted by the RAM 203 and/or the secondary storing apparatus 204, stores therein the color information extracted by the subject color information extracting unit 305. A subject collating unit 307 reads the subject attribute information stored during a predetermined period from the subject attribute information storing unit 304, and collates (or checks) the subjects in the video images respectively photographed by the imaging devices 101 to 103 based on the read subject attribute information. A subject collation result storing unit 308, which is constituted by the RAM 203 and/or the secondary storing apparatus 204, stores therein the subject collation result obtained by the subject collating unit 307.

A same subject deciding unit 309 decides whether or not the subject in the video image photographed by one camera is the same as the subject in the video image photographed by the other camera, based on the subject collation result stored in the subject collation result storing unit 308. A color correction parameter generating unit 310 reads, from the color information stored in the subject color information storing unit 306, the color information of the area in the video image which is occupied by the subject decided as the same subject by the same subject deciding unit 309, and generates a color correction parameter (color correction information) based on the read color information.

A color correction parameter storing unit 311, which is constituted by the RAM 203 and/or the secondary storing apparatus 204, stores therein the color correction parameter generated by the color correction parameter generating unit 310. A color correction parameter transmitting unit 312 extracts the color correction parameter from the color correction parameter storing unit 311 in response to a request from the monitoring apparatus 106, and transmits the extracted color correction parameter to the monitoring apparatus 106 via the network 104.

Figure 4:
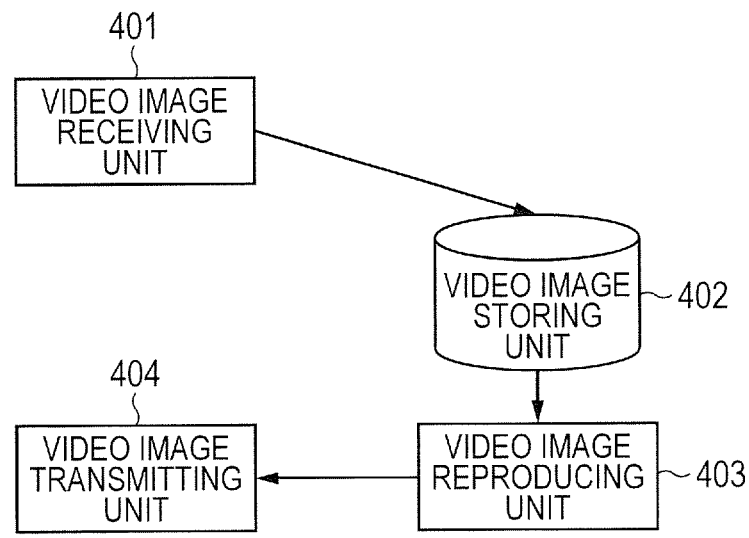
FIG. 4 is a block diagram illustrating an example of the function constitution of the recording apparatus.

FIG. 4 is the block diagram illustrating an example of the function constitution of the recording apparatus 107 according to the present embodiment. A video image receiving unit 401 receives the video image photographed by each of the imaging devices 101 to 103 from the network 104 via the network I/F 207. A video image storing unit 402, which is constituted by the RAM 203 and/or the secondary storing apparatus 204, stores therein the video image received by the video image receiving unit 401.

A video image reproducing unit 403 extracts and reproduces the recorded video image from the video image storing unit 402 in response to a request from the monitoring apparatus 106. A video image transmitting unit 404 transmits the video image reproduced by the video image reproducing unit 403 to the monitoring apparatus 106 from the network I/F 207 via the network 104.

Figure 5:
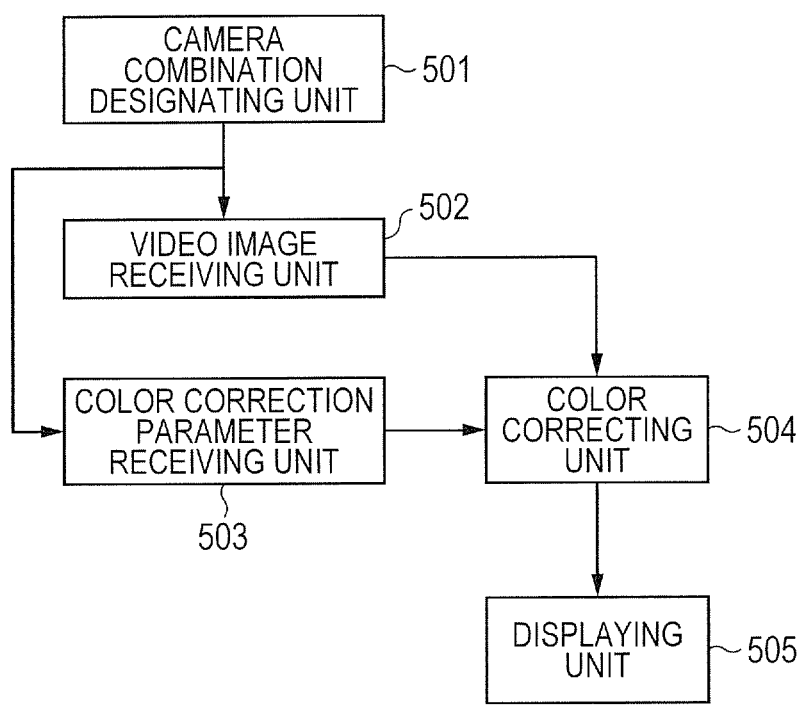
FIG. 5 is a block diagram illustrating an example of the function constitution of the monitoring apparatus.

FIG. 5 is the block diagram illustrating an example of the function constitution of the monitoring apparatus 106 according to the present embodiment.

A camera combination designating unit 501 designates a camera combination of the cameras to be monitored, based on a user's operation via the inputting apparatus 205.

A video image receiving unit 502 receives the video image photographed by each of the imaging devices 101 to 103 or the video image transmitted from the recording apparatus 107, from the network 104 via the network I/F 207. A color correction parameter receiving unit 503 receives the color correction parameter corresponding to the imaging device designated by the camera combination designating unit 501 from the inter-camera color correcting apparatus 105 via the network 104.

A color correcting unit 504 corrects the video image of the imaging device based on the color correction parameter received by the color correction parameter receiving unit 503. A displaying unit 505 displays, on the displaying apparatus 206, the video image of the imaging device corrected by the color correcting unit 504.

Subsequently, the flow of the process to be performed by the inter-camera color correcting apparatus 105 according to the present embodiment will be described with reference to the flow chart illustrated in FIG. 6. Incidentally, it should be noted that the inter-camera color correcting apparatus 105 is started based on a user's operation when the camera network is built out, when a new imaging device is added on the network, or the like. Here, the process indicated by the flow chart illustrated in FIG. 6 is an example of an information process to be performed by the inter-camera color correcting apparatus 105.

In the following processes, it is assumed that various set values such as a set period, a set threshold, a set detection window size, a set point and the like have previously been set as the files in the secondary storing apparatus 204 or the like of the inter-camera color correcting apparatus 105. Further, the inter-camera color correcting apparatus 105 may change the value set in the file, based on a user's input via the inputting apparatus 205 of the inter-camera color correcting apparatus 105. In any case, an example that a person is detected as the subject will be described in the present embodiment.

In S601, the video image receiving unit 301 receives, via the network 104, the video images respectively photographed by the imaging devices (cameras) 101 to 103 in units of frame image. Incidentally, each imaging device comprises the camera ID (identification data) inherent in the relevant imaging device, and time information is given to the frame image as the frame ID. The camera ID and the frame ID are associated with the frame image, and such information obtained is transmitted from each imaging device. It is possible to decide when the frame image received by the inter-camera color correcting apparatus 105 was photographed by which imaging device, based on the associated camera ID and the associated frame ID.

In S602, the subject detecting unit 302 detects the subject in the video image received in S601. In the following, it is assumed that the area information of the subject detected in S602 is subject area information. As a concrete subject detecting method, there is a background difference method of previously creating a background model from the video image only including the photographed background, and detecting the subject based on the difference between the background model and the input video image.

Moreover, as another subject detecting method for the case where the subject is a person, for example, there is the person detecting method described in Unites States Patent Application Publication No. 2007/0237387. In this method, the set size detection window is scanned on the input image, the pattern image is generated by cutting out the image in the detection window, and two-class decision as to whether or not the pattern image represents the person is performed. Besides, in this method, the discriminator is constituted by effectively combining the many weak discriminators with use of the AdaBoost to improve discrimination accuracy. Moreover, in this method, the discriminators are serially joined to constitute the cascade-type detector. The weak discriminator performs discrimination based on an HOG (histograms of gradiation) feature amount. Further, the cascade-type detector first eliminates the pattern candidates which are apparently not the subject on the instant by using the previous-stage simple discriminator, and then performs the discrimination only for the candidates other than the eliminated candidates by using the posterior-stage complicated discriminator having higher identifying performance.

Incidentally, although the subject is the person in the present embodiment, the present invention is of course applicable to another subject. For example, if the user wishes to use a vehicle as the subject, it only has to create the discriminator described in Unites States Patent Application Publication No. 2007/0237387 in regard to the vehicle.

The subject detecting unit 302 gives or adds the subject ID to the subject detected in such a manner as described above. When the plural subjects are detected in one frame image, the subject ID is used to distinguish each subject from others. Namely, the subject ID is uniquely given to the subject in the frame image. In the image frame, the subject area information represents the rectangle surrounding the person in the image frame by means of the x and y coordinates of the upper left and lower right points of the rectangle. Here, the origin of the coordinates is the upper left of the frame image. Besides, the subject area information may include a mask image in which the pixels corresponding to the person area are represented by "1" and other pixels are represented by "0". It becomes possible, by using the mask image, to distinguish the pixels of the person from the pixels of the matters other than the person in the rectangular area. In any case, the subject detecting unit 302 associates the detected subject area information with the camera ID, the frame ID and the subject ID, and outputs them to the subject attribute information extracting unit 303 and the subject color information extracting unit 305.

In S603, the subject attribute information extracting unit 303 extracts the subject attribute information from the area indicated by the subject area information extracted in S602, and stores the extracted subject attribute information in the subject attribute information storing unit 304. Besides, the subject attribute information extracting unit 303 extracts the attribute information of a shape and a pattern which are not related to color. Incidentally, it is desirable for the subject attribute information extracting unit 303 to extract more various kinds of attribute information in order to improve accuracy of a later-described same subject deciding process in S607. There are various attribute information extracting methods as exemplarily described below.

As a face attribute information extracting method, there is a method of cutting out plural small rectangular areas from the face area in an image, and extracting LBP (local binary pattern) feature amounts from the cut-out rectangular areas. Besides, as another face attribute information extracting method, for example, there may be a method of extracting the HOG feature amounts. Incidentally, as other face attribute information extracting methods, there are a method of selecting the random positions of plural rectangular areas and thus extracting the information of the selected positions, and a method of detecting the positions of facial organs (eyes, a mouse and a nose) as a pre-process, selecting positions from the vicinities of the positions of the facial organs, and thus extracting the information of the selected positions.

Incidentally, the attribute information indicating whether or not the subject (person) carries the bag or the like is not a numerical feature amount such as the LBP feature amount or the HOG feature amount calculated from the image, but is the feature which makes some sense to humans and is indicated by values within the range from "0" to "1". More specifically, when the attribute information indicates whether or not the subject carries the bag, "0" indicates that the subject does not carry the bag, whereas "1" indicates that the subject carries the bag. With respect to the attribute information indicating whether or not the subject carries the bag, since there is a case where it is impossible from only the image to clearly determine whether or not the subject carries the bag, there may be an intermediate value such as "0.5" or the like. Here, a method of extracting the attribute information indicating whether or not the subject carries the bag or the like is performed based on the LBP feature amount or the HOG feature amount which is related to a shape feature, or a texture feature. For example, the texture feature is a histogram corresponding to the result obtained by applying the Gabor filter or the Schmid filter to a person area. Besides, the texture feature may be a histogram obtained by joining histograms obtained by using the Gabor filter and the Schmid filter respectively.

A discriminator generating method is as follows. In this method, many correct images (e.g., person images of the person who carries the bag) and many mistake images (e.g., person images of the person who does not carry the bag) are prepared, the feature amounts are extracted from the respective person images, and a discriminator for discriminating the correct images and the mistake images from each other in a feature amount space based on the extracted feature amounts. In any case, as the discriminator, there is a known method such as the SVM (support vector machine) or the like.

Likewise, the subject attribute information extracting unit 303 can also extract other attribute information concerning whether or not the subject wears sunglasses, whether or not the subject has a beard, or the like.

As described above, the subject attribute information extracting unit 303 associates the extracted subject attribute information with the camera ID, the frame ID, the subject ID (of the extracted subject) and the subject area information. Incidentally, when extracting the plural pieces of subject attribute information, the subject attribute information extracting unit 303 associates the subject attribute information with the subject attribute ID defined for each kind of the subject attribute information. Thus, it is possible to perform collation for each kind in later-described S606.

In S604, the subject color information extracting unit 305 extracts the color information of the subject from the area indicated by the subject area information, and stores the extracted color information in the subject color information storing unit 306. When extracting the color information of the subject, the subject color information extracting unit first refers to the rectangular coordinates of the area indicated by the subject area information, and refers to the pixel included in the area of the subject from the frame image. At this time, when the mask information is included in the subject area information, the subject color information extracting unit further refers to the mask information. Thus, it is possible to extract the color information except for the pixels other than those of the subject included in the rectangle. Then, the subject color information extracting unit 305 calculates the cumulative histogram for each of R, G and B from the pixels of the subject by using an RGB color space. Incidentally, even if the same subject is photographed, the cumulative value is deviated according to, e.g., a condition that the position (posture) of the subject at the time when it is photographed by each camera is different from others. Therefore, to eliminate the influence exerted to the processes in and after S605, the cumulative histogram is standardized. Incidentally, the color space is not limited to the RGB color space but may be another color space such as an HSV color space, an YCbCr color space or the like. The subject color information extracting unit 305 associates the extracted cumulative histogram with the camera ID, the frame ID and the subject ID, and stores them in the subject color information storing unit 306.

In S605, the inter-camera color correcting apparatus 105 decides whether or not a set period (i.e., a predetermined time) elapses from the start of the process in the flow chart of FIG. 6. If it is decided by the inter-camera color correcting apparatus 105 that the set period elapses, the process is advanced to S606. On the other hand, if it is decided that the set period does not elapse, the process is returned to S601. Here, the series of the processes in S601 to S604 is performed for each camera. Therefore, in the inter-camera color correcting apparatus 105, the plural function constitutions each made by the video image receiving unit 301 to the subject color information storing unit 306 may be prepared respectively for the cameras so that the above processes can be performed in parallel for the cameras.

After the video images for the set period were processed, it is expected that the same person walked around and was thus photographed (or taken) by the plural cameras. Since the color of the same person does not change in the real world, it is possible by using such a fact to correct the color between the cameras. Hereinafter, the color correction will be described in detail.

In S606, the subject collating unit 307 sequentially extracts each two pieces of the subject attribute information having the different camera IDs from the subject attribute information storing unit 304, collates the extracted subject attribute information, and thus calculates a subject collation degree. As a collating method, there is a method of previously learning the Euclidean distance or the Mahalanobis' generalized distance. Incidentally, the collating process is performed for all the combinations of the different camera IDs in the subject attribute information stored in the subject attribute information storing unit 304. The subject collating unit 307 associates the calculated subject collation degree with the camera ID, the frame ID and the subject ID of a first camera to be collated and the camera ID, the frame ID and the subject ID of a second camera to be collated. Then, the subject collating unit 307 stores the obtained information as the collation result in the subject collation result storing unit 308.

In S607, the same subject deciding unit 309 decides whether or not the subjects photographed by the respective cameras are the same. At this time, the same subject deciding unit 309 can decide whether or not the subjects respectively associated with the subject collation degree are the same, by comparing the subject collation degree calculated in S606 with a set threshold. Namely, if it is decided that the subject collation degree is equal to or higher than the set threshold, the same subject deciding unit decides that the relevant subjects are the same. Incidentally, the same subject deciding unit 309 cannot decide whether or not all the subjects included in the video image are the same, because the color information is not used. However, there is no problem because the present embodiment aims to perform the color correction by using the color information of the area of the subject decided as being the same in the range being presumable by information other than the color information. The same subject deciding unit 309 obtains the plural same subjects photographed by such a set of the cameras, for each camera combination. For example, since there are the three cameras in the present embodiment, the same subject deciding unit 309 obtains the combination of the plural areas of the same person for each 3C2=3 sets. Since it is desirable to sufficiently obtain the number of the combinations, it may be possible to return the process to S601 if the number of the combinations does not reach a set number.

Incidentally, there is a case where the subject attribute information of one person is similar to that of the other person. For example, when a person A carries a bag and wears sunglasses and likewise a person B carries a bag and wears sunglasses, the subject collation degree between the person A photographed by the first camera and the person B photographed by the second camera becomes equal to or higher than the set threshold. To eliminate such a situation and increase a possibility that these persons are the same subject, the same subject deciding unit 309 may further use such a method as described below.

That is, if the period for which the person walks from one camera and arrives at the other camera is sufficiently short, the possibility that the persons photographed by these cameras are the same increases. Therefore, the same subject deciding unit 309 can improve estimation accuracy of the same subject by referring to the subject collation degree only for the camera combination of the cameras being closer relation than the set threshold.

Figure 7:
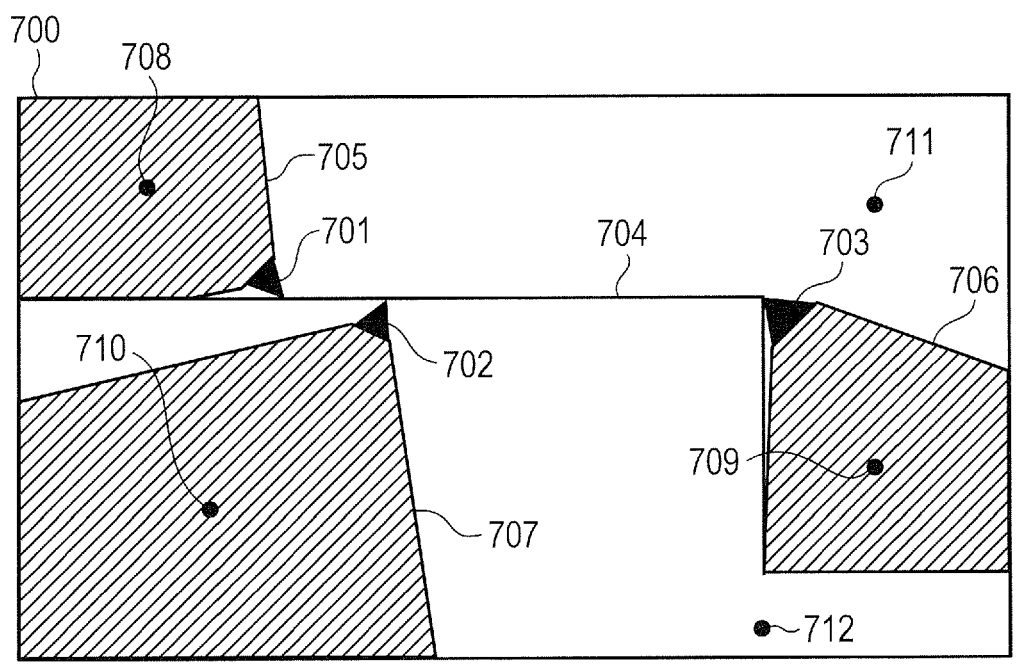
FIG. 7 is a diagram illustrating camera layout information.

The above camera combination can be obtained as follows. That is, FIG. 7 is a diagram illustrating an example of camera layout information for the arranged cameras. Here, the layout information is the information indicating the arrangement of the cameras. Namely, FIG. 7 shows the layout information which indicates how the cameras have been arranged in a watch-target area 700. The inter-camera color correcting apparatus 105 obtains the camera combination of the cameras between which the distance is smaller than the set threshold, based on the layout information. Here, the inter-camera color correcting apparatus 105 does not use the Euclidean distance as the distance between the cameras, but uses the route from one camera to the other camera. For example, in FIG. 7, the distance between cameras 701 and 702 is smaller as the Euclidean distance than the distance between cameras 701 and 703. However, since a wall 704 is located, it is impossible to reach from the camera 701 to the camera 702 without detouring around the wall. For this reason, in the cameras 702 and 703, the camera which is closer to the camera 701 is the camera 703. For example, the inter-camera color correcting apparatus 105 can obtain the route between the cameras in such a manner as described below. That is, the inter-camera color correcting apparatus 105 can obtain the route as the sum of the Euclidean distances of the lines obtained by joining points 708 to 710 set in the photographing ranges of the respective cameras (i.e., ranges 705 to 707 indicated by the oblique lines in FIG. 7) and points 711 to 712 representative of the routes between the cameras in order of route.

If it is decided that the subjects associated with the subject collation degree are the same, the same subject deciding unit 309 outputs the camera ID, the frame ID and the subject ID associated with the subject collation degree to the color correction parameter generating unit 310.

In S608, the color correction parameter generating unit 310 extracts the color information corresponding to the camera ID, the frame ID and the subject ID output in S607, from the subject color information storing unit 306. Then, the color correction parameter generating unit 310 generates the color correction parameter based on the extracted color information. In the present embodiment, the color correction parameter generating unit 310 can use a BTF (brightness transfer function) as the color correction parameter. The BTF is based on an assumption that the rate between the pixels and the person area up to a certain brightness value included in the same person area is invariable, and is obtained from the cumulative histogram of the person area. The color correction parameter generating unit 310 stores, in the color correction parameter storing unit 311, the BTF as a lookup table indicating the relation of the respective brightness values between the cumulative histograms. For example, with respect to the BTF between the camera ID=1 and the camera ID=2, if it is assumed that the range of the values of each of R, G and B colors is "0" to "255", the corresponding brightness value of R of the camera ID=2 in regard to each brightness value ("0" to "255") of R of the camera ID=1 is described as the table.

Incidentally, there may be a bias in the values of the pixels in the person area. Therefore, in order to deal with the influence of the bias for a set of the cameras, it is necessary to determine the color correction parameter based on the image in which a sufficient number of the same persons have been photographed. Therefore, it may be possible to add, before the process in S608, a process of deciding whether or not there is a color bias, and, if it is decided that there is the color bias, to return the process to S601 to again collect the color information of the same subject. As a color bias deciding method, for example, there is a method of creating the histograms from the used color information of the same subject, adding up all the created histograms, and deciding whether or not the frequency value of the bin for each of the R, G and B brightness values is equal to or higher than a predetermined value. When the bin of which the frequency value is lower than the predetermined value exists, the inter-camera color correcting apparatus 105 decides that there is the bias.

Besides, it is impossible, in the deciding process of S607 based on the subject collation degree, to correctly decide whether or not the subjects having the similar subject attribute information are the same. In S608, if the color information of the subject being not the same is included in the data for generating the color correction parameter, it is difficult for the color correction parameter generating unit 310 to accurately obtain the color correction parameter. To reduce such influence, it may be possible to use such a method as described below.

The inter-camera color correcting apparatus 105 randomly extracts two from all the same subjects estimated in S607 to create plural sets (subsets), and temporarily stores the created sets in the RAM 203. Then, in S608, the color correction parameter generating unit 310 generates the color correction parameter for each set. Next, the color correction parameter generating unit 310 performs a process of estimating the true color correction parameter from the plural color correction parameters generated. The BTF being the color correction parameter is represented by means of the lookup table on which the brightness value of the other camera in regard to the brightness value of one camera has been described. Since the plural sets are created, the plural BTFs corresponding to other cameras are created in regard to a certain camera.

The inter-camera color correcting apparatus 105 specifies the plural brightness values from the plural BTFs in regard to each brightness value of the image of one camera. For example, it is assumed that the inter-camera color correcting apparatus 105 specifies "52", "104", "50", "56" and "72" as the brightness values of R of the camera ID=2, in regard to the brightness value "50" of R of the camera ID=1. The inter-camera color correcting apparatus 105 obtains the difference (distance) in the case where the two brightness values are selected from the brightness values of R of the camera ID=2, and obtains the average from the brightness values having the difference (distance) within the set threshold. For example, if it is assumed that the threshold is "5", the brightness values "50", "52" and "56" are extracted from the brightness values "52", "104", "50", "56" and "72", the average "53" is obtained from the extracted values, and "53" is finally set as the brightness value of R of the camera ID=2 corresponding to the final camera ID=1.

As just described, it can be expected by creating the plural sets (subsets) that the bias of the pixels in the area of the same subject is different for each set. Therefore, the color correction parameter generating unit 310 can obtain the highly accurate color correction parameter by eliminating the influence of the color correction parameter which statically becomes an outlier.

In S609, the inter-camera color correcting apparatus 105 stands ready until a color correction is requested from the monitoring apparatus 106. When the color correction is requested to the inter-camera color correcting apparatus 105, the process is advanced to S610.

In S610, the color correction parameter transmitting unit 312 extracts the color correction parameter corresponding to the camera combination of the cameras to be subjected to the color correction, from the color correction parameter storing unit 311. Then, the color correction parameter transmitting unit 312 transmits the extracted color correction parameter to the monitoring apparatus 106 via the network 104.

Subsequently, the process to be performed by the recording apparatus 107 according to the present embodiment will be described with reference to the flow chart illustrated in FIG. 8. That is, FIG. 8 is the flow chart for describing an example of the process to be performed by the recording apparatus 107.

In S801, the recording apparatus 107 decides, based on a user's operation via the inputting apparatus 205, whether or not an end instruction is issued. If it is decided that the end instruction is issued, the recording apparatus 107 ends the processes indicated in the flow chart of FIG. 8. On the other hand, if it is decided that the end instruction is not issued yet, the process is advanced to S802. The recording apparatus 107 repeats the processes in S802 to S806 until the end instruction is issued by the user.

In S802, the video image receiving unit 401 receives the video images respectively photographed by the imaging devices 101 to 103 on the network 104 in units of frame image, and stores the received video images in the video image storing unit 402. As described above, each imaging device has the camera ID inherent in the relevant imaging device, and the frame image has the time information as the frame ID. Each imaging device associates the frame image with the camera ID and the frame ID, and transmits them. Thus, it is possible to discriminate when the video image of the frame image received in S802 was transmitted from which imaging device, on the basis of the camera ID and the frame ID respectively associated.

In S803, the recording apparatus 107 decides whether or not a reproduction request of the recorded video image from the monitoring apparatus 106 is received. If it is decided by the recording apparatus 107 that the reproduction request of the recorded video image is received, the process is advanced to S804. On the other hand, if it is decided that the reproduction request of the recorded video image is not received, the process is returned to S801.

In S804, the video image reproducing unit 403 sequentially reads the frame image from the video image storing unit 402 and performs reproduction, based on the camera ID and the frame ID requested in S803. In S805, the video image transmitting unit 404 transmits the video image reproduced by the video image reproducing unit 403 to the monitoring apparatus 106 via the network 104.

In S806, the recording apparatus 107 decides whether or not a reproduction end request from the monitoring apparatus 106 is received. If it is decided by the recording apparatus 107 that the reproduction end request is received, the process is returned to S801. On the other hand, if it is decided that the reproduction end request is not received, the process is returned to S804. The recording apparatus 107 repeats the processes in S804 and S805 to continue the reproduction until the reproduction end request is received.

Subsequently, the process to be performed by the monitoring apparatus 106 according to the present embodiment will be described with reference to the flow chart illustrated in FIG. 9. That is, FIG. 9 is the flow chart for describing an example of the process to be performed by the monitoring apparatus 106.

In S901, the camera combination designating unit 501 stands ready until a camera combination of the cameras to be monitored is designated based on a user's operation via the inputting apparatus 205. In the present embodiment, it is assumed that the video image currently photographed by the first camera and the video image photographed by the second camera and then recorded are designated as the camera combination. If the camera combination is designated in S901, in S902, the monitoring apparatus 106 requests the color correction parameter to the inter-camera color correcting apparatus 105 based on the camera ID corresponding to the designated camera.

In S903, the color correction parameter receiving unit 503 receives from the inter-camera color correcting apparatus 105 the color correction parameter corresponding to the camera combination designated in S902. In S904, the video image receiving unit 502 receives the video image of one of the cameras in the camera combination designated in S901. In S905, as well as S904, the video image receiving unit 502 receives from the recording apparatus 107 the recorded video image of the camera, included in the camera combination designated in S901, of which the video image was not received in S904.

In S906, the color correcting unit 504 performs a color correcting process by using the color correction parameter received by the color correction parameter receiving unit 503 in S903. Here, the color correcting process is performed by applying the BTF to the brightness value of each of R, G and B. Incidentally, it may be possible to perform the correction so as to adjust the video image of the first camera to the video image of the second camera, whereas it may be possible to perform the correction so as to adjust the video image of the second camera to the video image of the first camera. That is, the color correction parameter generating unit 310 may generate the color correction parameter (color correction information) to be used for at least either the process of causing the displaying unit 505 to display the image photographed by the first camera or the process of causing the displaying unit 505 to display the image photographed by the second camera.

Besides, the color correction parameter generating unit 310 may generate the color correction parameter so as to make an intermediate color between the color information of the subject in the video image photographed by the first camera and the color information of the subject in the video image photographed by the second camera. That is, it may be possible to generate the color correction parameter so as to adjust the color to the color information having the characteristic between the color information of the subject in the video image photographed by the first camera and the color information of the subject in the video image photographed by the second camera. For example, it may be possible to generate the color correction parameter so as to have the intermediate characteristic between the color information of the subject in the video image of the first camera and the color information of the subject in the video image of the second camera. If the color correction parameter corresponding to the intermediate characteristic between the two pieces of the color information of the two video images is used, it is possible to obtain an easily visible video image which is not too brighter or too darker. In this case, both the color correction parameter to be used for the process of causing the displaying unit to display the video image photographed by the first camera and the color correction parameter to be used for the process of causing the displaying unit to display the video image photographed by the second camera are generated.

Besides, the color correction parameter generating unit 310 may generate the color correction parameter according to the result obtained by comparing the video image photographed by the first camera with the video image photographed by the second camera. For example, it may be possible to compare the average brightness of the respective pixels in the video image photographed by the first camera with the average brightness of the respective pixels in the video image photographed by the second camera and then generate the color correction parameter corresponding to the brighter video image.

Besides, in a case where an area (e.g., an area including blown-out highlights) of first brightness or more in the video image photographed by the first camera is narrower than the area of the first brightness or more in the video image photographed by the first camera, the color correction parameter generating unit 310 may generate the color correction parameter to be used for the process of causing the displaying unit to display the video image photographed by the second camera. By doing so, since it is possible to adjust the too-brighter area to the smaller video image, the video image becomes more visible.

Besides, in a case where an area (e.g., an area including blocked-up shadows) of second brightness or less in the video image photographed by the first camera is narrower than the area of the second brightness or less in the video image photographed by the first camera, the color correction parameter generating unit 310 may generate the color correction parameter to be used for the process of causing the displaying unit to display the video image photographed by the second camera. By doing so, since it is possible to adjust the too-darker area to the smaller video image, the video image becomes more visible. Here, the first brightness is the brightness brighter than the second brightness.

Thus, the color correction parameter generating unit 310 can generate the color correction parameter in which visibility has been sufficiently considered and regarded.

Again, the process of the flow chart illustrated in FIG. 9 will be described. In S907, the displaying unit 505 causes the displaying apparatus 206 to display the corrected video images of the first and second cameras. In S908, the monitoring apparatus 106 decides whether or not a monitoring end is instructed, based on a user's operation via the inputting apparatus 205. If it is decided by the monitoring unit 106 that the monitoring end is instructed, the process in the flow chart of FIG. 9 is ended. On the other hand, if it is decided that the monitoring end is not instructed, the process is returned to S904.

By the above process in the present embodiment, the camera network system can perform the color correction between the cameras without user's operations such as an instruction for photographing a reference chart, designation of the same person, and the like. The inter-camera color correcting apparatus 105 decides whether or not the persons respectively included in the different video images are the same, within the range which can be estimated by the subject attribute information other than color. The inter-camera color correcting apparatus 105 can obtain the color correction parameter between the cameras based on the color information included in the same person. The monitoring apparatus 106 can perform, based on the obtained color correction parameter, the color correction in case of performing the monitoring by displaying the screens of the two cameras. Then, since the clothing and the hair color of the person photographed by each camera is correctly reproduced, it is possible for the user to correctly decide whether or not each of all the persons on the screens is the same person to be watched.

In the present embodiment, the inter-camera color correcting apparatus 105 is constituted as the single apparatus. However, it may be possible to disperse the function constitutions of the apparatus to other apparatuses and devices on the network. For example, it may be possible to constitute each of the imaging devices 101 to 103 so as to include the subject detecting unit 302, the subject attribute information extracting unit 303 and the subject color information extracting unit 305 and transmit only the subject attribute information and the subject color information to other apparatuses via the network.

The present invention can be achieved also by the process that the program for achieving one or more functions of the above embodiment is supplied to a system or an apparatus via a network or a storage medium and the supplied program is read and executed by one or more processors in the computer of the system or the apparatus. In addition, the present invention can be achieved also by a circuit (e.g., an ASIC) for achieving one or more functions of the above embodiment.

According to the above embodiment, it is possible to reduce the difference of color between the cameras even in the case where the photographing ranges of the plural cameras do not overlap.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-008923, filed Jan. 20, 2015, which is hereby incorporated by reference herein in its entirety.

What is claimed is:

1. An image processing system comprising:
at least one processor; and
a memory having stored thereon instructions which, when executed by the at least one processor, cause the image processing system to:
detect subjects from a first image photographed by a first camera and a second image photographed by a second camera different from the first camera;
decide whether or not a first subject photographed by the first camera and a second subject photographed by the second camera are a same subject, based on a face attribute of the first subject and the second subject;
generate color correction information based on information indicating color of plural sets of the subjects decided as the same;
correct both the first image photographed by the first camera and the second image photographed by the second camera, by using the color correction information; and
display the corrected first image and the corrected second image,
wherein generating the color correction information includes generating the color correction information to be used in the process of correcting the second image and displaying the corrected second image, in a case where a first area having at least a first brightness, in the second image photographed by the second camera, is narrower than a second area having at least the first brightness, in the first image photographed by the first camera.

2. The image processing system according to claim 1, wherein the instructions, when executed by the at least one processor, further cause the image processing system to, in a case where it is decided that the first subject photographed by the first camera and the second subject photographed by the second camera are the same subject, generate the color correction information to be used for at least either a process of displaying the first image photographed by the first camera or a process of displaying the second image photographed by the second camera, on the basis of information indicating a color in the first subject and information indicating a color in the second subject.

3. The image processing system according to claim 1, wherein the instructions, when executed by the at least one processor, further cause the image processing system to randomly select a predetermined number of sets from the plural sets of the subjects, and determine final color correction information based on the color correction information obtained for each of the selected sets.

4. The image processing system according to claim 1, wherein the instructions, when executed by the at least one processor, further cause the image processing system to decide whether or not the first subject photographed by the first camera and the second subject photographed by the second camera are the same subject, on the basis of a shape or a pattern of a detected subject.

5. The image processing system according to claim 1, wherein the instructions, when executed by the at least one processor, further cause the image processing system to select, from among plural cameras, a camera to be used as the first camera and a camera to be used as the second camera, according to information indicating a camera layout.

6. The image processing system according to claim 5, wherein the instructions, when executed by the at least one processor, further cause the image processing system to select the camera to be used as the first camera and the camera to be used as the second camera, from among the plural cameras of which inter-camera routes are shorter than a set distance.

7. The image processing system according to claim 1, wherein the instructions, when executed by the at least one processor, further cause the image processing system to:
   extract attribute information related to a shape or a pattern from an area of a detected subject; and
   obtain a collation degree by collating the plural subjects among the cameras on the basis of the attribute information, wherein
   the deciding includes deciding whether or not the first subject and the second subject are the same subject, on the basis of the obtained collation degree.

8. The image processing system according to claim 1, wherein the instructions, when executed by the at least one processor, further cause the image processing system to extract color information from the same subject, wherein
   the generating generates the color correction information on the basis of the extracted color information of the same subject.

9. The image processing system according to claim 1, wherein the instructions, when executed by the at least one processor, further cause the image processing system to:
   create plural sets from the subjects decided as the same subject,
   generate color correction information for each of the created sets, and
   generate final color correction information on the basis of the plural generated color correction information.

10. The image processing system according to claim 1, wherein the instructions, when executed by the at least one processor, further cause the image processing system to decide whether or not there is a bias in color of areas of the subjects decided as the same subject, wherein
    the generating includes generating the color correction information in a case where it is decided that there is no bias.

11. The image processing system according to claim 1, wherein the instructions, when executed by the at least one processor, further cause the image processing system to, in the generating, generate the color correction information to be used in the process of displaying the first image photographed by the first camera, and generate the color correction information to be used in the process of causing the displaying of the second image photographed by the second camera.

12. The image processing system according to claim 1, wherein the instructions, when executed by the at least one processor, further cause the image processing system to compare the first image photographed by the first camera and the second image photographed by the second camera with each other, wherein the generating includes generating the color correction information according to a result of the comparison.

13. An image processing method comprising:
    detecting subjects from a first image photographed by a first camera and a second image photographed by a second camera different from the first camera;
    deciding whether or not a first subject photographed by the first camera and a second subject photographed by the second camera are a same subject, based on a face attribute of the first subject and the second subject;
    generating color correction information based on information indicating color of plural sets of the subjects decided as the same subject;
    correcting both the first image photographed by the first camera and the second image photographed by the second camera, by using the generated color correction information; and
    displaying the corrected first image and the corrected second image,
    wherein generating the color correction information includes generating the color correction information to be used in the process of correcting the second image and displaying the corrected second image, in a case where a first area having at least a first brightness, in the second image photographed by the second camera, is narrower than a second area having at least the first brightness, in the first image photographed by the first camera.

14. A non-transitory computer-readable medium which stores a program for causing a computer to perform steps comprising:
    detecting subjects from a first image photographed by a first camera and a second image photographed by a second camera different from the first camera;
    deciding whether or not a first subject photographed by the first camera and a second subject photographed by the second camera are a same subject, based on a face attribute of the first subject and the second subject;
    generating color correction information based on information indicating color of plural sets of the subjects decided as the same subject;
    correcting both the first image photographed by the first camera and the second image photographed by the second camera, by using the generated color correction information; and
    displaying the corrected first image and the corrected second image,
    wherein generating the color correction information includes generating the color correction information to be used in the process of correcting the second image and displaying the corrected second image, in a case where a first area having at least a first brightness, in the second image photographed by the second camera, is narrower than a second area having at least the first brightness, in the first image photographed by the first camera.

* * * * *